(12) United States Patent
Mateer (10) Patent No.: US 11,523,601 B2
(45) Date of Patent: Dec. 13, 2022

(54) INSECT CONTROL DEVICE AND METHOD FOR HOUSEHOLD OUTDOOR GARBAGE RECEPTACLES

(71) Applicant: WOODSTREAM CORPORATION, Lititz, PA (US)

(72) Inventor: Chad Mateer, Manheim, PA (US)

(73) Assignee: Woodstream Corporation, Lancaster, PA (US)

( * ) Notice: Subject to any disclaimer, the term of this patent is extended or adjusted under 35 U.S.C. 154(b) by 392 days.

(21) Appl. No.: 16/583,329

(22) Filed: Sep. 26, 2019

(65) Prior Publication Data

US 2020/0128809 A1    Apr. 30, 2020

Related U.S. Application Data

(60) Provisional application No. 62/751,154, filed on Oct. 26, 2018.

(51) Int. Cl.
*A01M 1/20* (2006.01)
*A01N 57/12* (2006.01)

(52) U.S. Cl.
CPC ........... *A01M 1/2055* (2013.01); *A01N 57/12* (2013.01)

(58) Field of Classification Search
CPC ............................. A01M 1/2055; A01N 57/12
See application file for complete search history.

(56) References Cited

U.S. PATENT DOCUMENTS

| | | | | |
|---|---|---|---|---|
| 2,748,765 | A | * | 6/1956 | Scholl .................. A61F 13/063 128/894 |
| 3,659,373 | A | * | 5/1972 | Daeninckx .......... A01M 1/2055 43/125 |
| 3,790,081 | A | * | 2/1974 | Thornton ............ A01M 1/2055 239/55 |
| 3,807,082 | A | * | 4/1974 | Hautmann .......... A01M 1/2055 43/125 |
| 3,814,061 | A | * | 6/1974 | Aries .................. A01K 27/007 119/863 |

(Continued)

FOREIGN PATENT DOCUMENTS

WO    WO-9519305 A1 *    7/1995    .......... A01M 1/2055

OTHER PUBLICATIONS

Nuvan® Prostrips®; Nuvan ProStrips Large Size (65 gram × 3 pack).

(Continued)

*Primary Examiner* — Brady W Frazier
(74) *Attorney, Agent, or Firm* — Barley Snyder (57) ABSTRACT

An insect control device is provided for controlling insects in a household garbage receptacle used in an outdoor or semi-outdoor environment. The insect control device includes an outer housing with gas-flow apertures therein, a quantity of a gas-releasing insect poison contained within the housing, and an adhesive attaching element for securing the housing to an inner surface of a closed or lidded household garbage receptacle. Gas released by the insect poison flows out of the housing through the gas-flow apertures to permeate the air inside the enclosed garbage containment area and kill insects therein while the adhesive element keeps the device securely in place within the garbage receptacle and out of the reach of children and pets during both use and emptying of the receptacle.

20 Claims, 8 Drawing Sheets

(56) References Cited

U.S. PATENT DOCUMENTS

| | | | | |
|---|---|---|---|---|
| 3,864,867 A | * | 2/1975 | Dry | A01M 1/2011 43/131 |
| 3,876,762 A | * | 4/1975 | Bernard | A01M 1/2044 239/55 |
| 4,161,283 A | * | 7/1979 | Hyman | A01M 1/2044 239/55 |
| 5,071,704 A | * | 12/1991 | Fischel-Ghodsian | A01N 25/18 428/354 |
| 5,280,684 A | * | 1/1994 | Filonczuk | A01M 1/02 43/112 |
| 5,988,520 A | * | 11/1999 | Bitner | B65F 7/00 220/300 |
| 8,657,139 B1 | * | 2/2014 | Bodine | A61L 9/12 220/87.1 |
| 2015/0115060 A1 | * | 4/2015 | Klemm | A01M 1/2033 239/152 |
| 2015/0352241 A1 | * | 12/2015 | Furner | A01M 29/12 422/105 |

OTHER PUBLICATIONS

AMVAC™ Small Insect Strip; EPA Reg. No. 5481-344; May 16, 2013.
AMVAC™ Small Pro-strip; EPA Reg. No. 5481-553; Aug. 7, 2013.
Alco Small Pest Strip; EPA Reg. No. 5481-348; Mar. 8, 2017.
Hot Shot® No-Pest® Strip, Controlled Release Technology.
Ortho® Home Defense® Max™ No-Pest® Insecticide Strip.
Hovex Vaporguard Bin Insect Killer.
Fruit Fly Bar Pro FFBP Fruit Fly Strip.

* cited by examiner

INSECT CONTROL DEVICE AND METHOD FOR HOUSEHOLD OUTDOOR GARBAGE RECEPTACLES

This application claims priority from U.S. provisional application Ser. No. 62/751,154, filed Oct. 26, 2018.

BACKGROUND OF THE INVENTION

Field of the Invention

The present invention is related to the field of pest control and, more particularly, to insect control for household garbage receptacles or other closed trash containers used in outdoor or semi-outdoor environments such as garages and sheds.

Description of the Related Art

Garbage receptacles that are kept outdoors or in semi-outdoor environments such as in garages or warehouses are susceptible to insect infestation, particularly if the garbage must be stored in the receptacles Tor an extended length of time. Insect control products for commercial, and professional use in unoccupied areas have been available for many years. These products include Dichlorvos pest strips in various sizes that are enclosed within a plastic cage that is configured to be hung from or stood on a surface within a defined area such as a storage unit, garage, closet, attic, crawl space, and the like. The hanging or standing configuration allows the insect poison to be released through all sides of the plastic cage for effective distribution within an interior or semi-interior space.

However, in smaller spaces such as household garbage receptacles, there is insufficient room to accommodate the hanging or standing pest strips of the type used in storage rooms without compromising the holding capacity of the garbage receptacle. Further, household garbage receptacles such as curbside toters are subject to regular emptying by a third party for example, a garbage collection service by which a hanging or standing pest strip is repeatedly subject to damage and/or loss. One solution has been to attach the hanging strip to the toter handle with a cable tie. However, this can result in an unwanted exterior placement of the pest strip, particularly following trash pickup.

Therefore a need exists for an economical insect control device that is compact, and readily securable within a household-sized outdoor garbage receptacle to effectively kill insects and prevent their proliferation while remaining secure within the garbage receptacle over the effective span of the insect poison contained therein.

SUMMARY OF THE INVENTION

In view of the foregoing, the present invention is directed to an economical insect control device having an outer housing with gas-flow apertures therein, a quantity of gas-releasing insect poisons contained within the housing, and an adhesive attaching element for securing the housing to an inner surface of a covered or lidded household outdoor garbage receptacle. Once the insect control device is secured on the inner surface of the receptacle, the lid of the garbage receptacle is closed to create an enclosed garbage containment area. The gas released by the insect poison flows out of the housing through the gas-flow apertures to permeate the air in the enclosed garbage containment area and kill insects therein, while the adhesive attaching element keeps the device safely secured inside the receptacle where it cannot be accessed by children or pets. The low profile of the outer housing also avoids interfering with the use and emptying of the garbage receptacle.

Accordingly, it is an object of the present invention to provide an insect control device having an insect poison with a gaseous component for killing insects within a closed or lidded household garbage receptacle, such as a garbage can, trash dumpster or trash bin, kept in an outdoor or semi-outdoor environment, the device having an adhesive element for safely securing the device inside the household outdoor garbage receptacle daring both use and emptying thereof.

Another object of the present invention to provide an insect control device in accordance with the preceding object in which the outer housing includes two separable pieces that are coupled together with a snap fit, a threaded engagement and the like, or two pieces conjoined along a common edge by a living hinge, to define an interior space that contains a substrate infused with or otherwise containing the insect poison, the gaseous component thereof being released through the gas-flow apertures and into an enclosed area created by the household garbage receptacle when in use.

Yet another object of the present invention to provide an insect control device in accordance with the preceding object in which the housing has at least one substantially planar outer surface that preferably includes a non-apertured region, the adhesive element being secured to the planar outer surface and used to affix the housing to an inner surface of the closed or lidded household garbage receptacle.

A further object of the present invention is to provide an insect control device in accordance with the preceding objects in which the outer housing contains 5.25 grams of 18.6% Dichlorvos substrate which is sandwiched in an inner space between the two pieces of the housing and supported by spacing and support members formed on the inside surface of each of the two pieces.

A still further object of the present invention is to provide an insect control device in accordance with at least one of the preceding objects in which any of the gaseous poison escaping from the receptacle when the lid is opened will dissipate into the open air of the outdoor or semi-outdoor environment without harming people, animals or plants in the surrounding area.

Yet a further object of the present invention is to provide an insect control device in accordance with the preceding objects in which the spacing and support members include two longitudinal ribs intersected by a transverse rib having an alignment member at each end thereof, the alignment members being generally parallel with the longitudinal ribs and acting as stops to keep the substrate generally centered laterally within the housing.

Another object of the present invention is to provide an insect control device in accordance with the preceding object in which the housing pieces also include longitudinal stops provided at the ends of the longitudinal ribs to generally center the substrate longitudinally within the housing so that when the two housing pieces are snap fit or otherwise secured to one another, the substrate is sandwiched between the spacing and support members of each piece, and bounded on its lateral and longitudinal sides by the alignment members and longitudinal stops, respectively.

Yet another object of the present invention is to provide an insect control device in accordance with the preceding object in which the housing is between about 2 inches to about 4 inches in length and between about 1.5 inches and about 2.0 inches in width, and when mounted has a thickness profile protruding into an interior garbage containing area of the garbage receptacle of only about 0.5 inches or less.

Still another object of the present invention is to provide a method of controlling insects in a closed or lidded household outdoor garbage receptacle by securing an insect control device to an inner surface of the household garbage receptacle using an adhesive element and closing the receptacle, the insect control device including an outer housing with at least one substantially flat side and a plurality of gas-flow apertures therein and having a quantity of gas-releasing insect poison positioned within the housing, a gaseous component of the poison escaping from the outer housing through the gas-flow apertures therein to permeate an enclosed garbage containment area defined by the outdoor household garbage or trash receptacle when in use.

A further object of the present invention is to provide an insect control device in accordance with the preceding objects that is marketed with a substrate strip pre-assembled within an outer housing which is contained within a sealed bag, pouch or other containment layer or enclosure, the consumer removing the pouch or containment layer just prior to use and then securing the adhesive element, embodied as a piece of double-sided adhesive tape, to an outer surface of the housing and to an inner surface of a household garbage can, trash dumpster or trash bin, the device having a low profile that does not interfere with either the placement of garbage into the receptacle or the emptying thereof and the device further being securely kept within the receptacle and out of the reach of children and pets.

Still a further object of the present invention is to provide an insect control device and method in accordance with at lease one of the preceding objects in which the gaseous component of the insect poison is released over time to effectively kill flying and crawling insects including flies, gnats, mosquitos, moths, silverfish, cockroaches, spiders, beetles, earwigs, spider mites, and the like, for about four months when the insect control device is placed within a closed household garbage receptacle such as a lidded garbage can, trash dumpster or trash bin.

Yet a further object of the present invention is to provide an insect control device and method in accordance with at least one of the preceding objects that is inexpensive and easy to use for household consumers, can be readily manufactured, and is safe and effective for killing insects and preventing new infestations in an enclosed space while preventing access to the insecticide by children and pets when used as directed.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in FIGS. 1-6, the present invention is directed to an insect control device generally designated by reference numeral 10. The insect control device 10 includes an outer housing generally designated by reference numeral 12 having a plurality of gas-flow apertures 14 therein. The outer housing has at least one substantially planar outer surface generally designated by reference numeral 13 that preferably includes a non-apertured region 15. A quantity of gas-releasing insect poison 16, as embodied in a brick-like solid substrate containing an insect poison that releases a gaseous component in use, is contained within the housing 12. An attaching element generally designated by reference numeral 19, here embodied as an adhesive element 18, is configured to be secured to the non-apertured region 15 of the housing outer surface 13. While not essential, having a non-apertured region 15 provides full surface contact area between the housing and the adhesive element and is therefore preferred.

According to a preferred embodiment, the active ingredient in the poison held within the substrate is Dichlorvos (2,2-dichlorovinyl dimethyl phosphate), which is preferably 18.6% of the composition, with the substrate weighing 5.25 grams. The vapor is released from the housing by volatilization and is odorless while being effective to deeply penetrate the surrounding area. Dichlorvos substrates that are suitable for use with the present invention are commercially available from various vendors. The present invention is also intended to include embodiments that utilize other active ingredients for insect control that are now available or that will be available in the future such as, for example, Transfluthrin, registered in the U.S. to Bayer Chemical Company.

According to a preferred embodiment, the outer housing is comprised of two interchangeable pieces 12A, 12B, preferably of molded plastic. Each piece has an outer surface 20 having the substantially planar outer surface 13 and non-apertured region 15, an inner surface 22 and adjoining edges 24. The edges 24 are formed to enable the two pieces 12A, 12B to be fastened together, preferably with a snap fit, to define an inner space 26 (see FIG. 6). Alternatively, the two pieces may be joined to one another along a common edge as by a living hinge and snap-fit on the opposing side. The two pieces could also be threadedly engaged, such as with a disc-shaped outer, housing having upper and lower parts that are screwed together to define the interior or inner space 26.

The gas-releasing poison substrate 16 is positioned within the inner space 26, as covered by the housing 12, while the gas-flow apertures 14 allow gas released by the insect poison to flow out of the housing. The gas-releasing poison substrate 16 is preferably embodied as a strip 17 infused with poison that is released by volatilization. The non-apertured region 15 of the outer surface 13 provides a stable mounting surface for the adhesive element 13 which is used to secure the device to an inner surface of a household garbage receptacle 44 (see FIGS. 7C, 7D and 7F).

In the embodiment shown in FIGS. 1-6, the inner surface 22 of the housing pieces 12A, 12B includes structural members 28 to add rigidity to the housing as well as spacing and support members generally designated by reference numeral 30 to stiffen the housing and allow for air flow between the poison substrate 16 and the housing inner surface 22. The spacing and support members 30 preferably include two longitudinal ribs 30a, 30b intersected by a transverse rib 30c. Two alignment members 31 are also provided, one at each end of the transverse rib 30c. The alignment members 31 are generally parallel with the longitudinal ribs 30a, 30b and act as stops to keep the substrate strip 17 centered laterally within the housing. Longitudinal stops 33 may also be provided at the ends of the longitudinal ribs to center the substrate strip 17 longitudinally within the housing. When the two housing pieces 12A, 12B are secured to one another, the substrate strip 17 is thus kept in a generally centered position, sandwiched between the spacing and support members 30 of each piece, and bounded on its lateral and longitudinal sides by the alignment members 31 and longitudinal stops 33, respectively.

The length of the housing is preferably between about 2 inches to about 4 inches, and more preferably is about 2.625 inches. The width of the housing is preferably between about 1.5 inches to about 2.0 inches, and more preferably is 1.75 inches. As assembled, the thickness of the housing from top to bottom is preferably no more than about 0.5 inches such that the device, when adhered to an inner surface of the garbage receptacle protrudes only about 0.5 inches into the garbage holding area. As used herein in connection with the dimensions of the housing, "about" is intended to refer to the stated value plus or minus 0.25 inches.

Figures 8A, 8B, 9A:
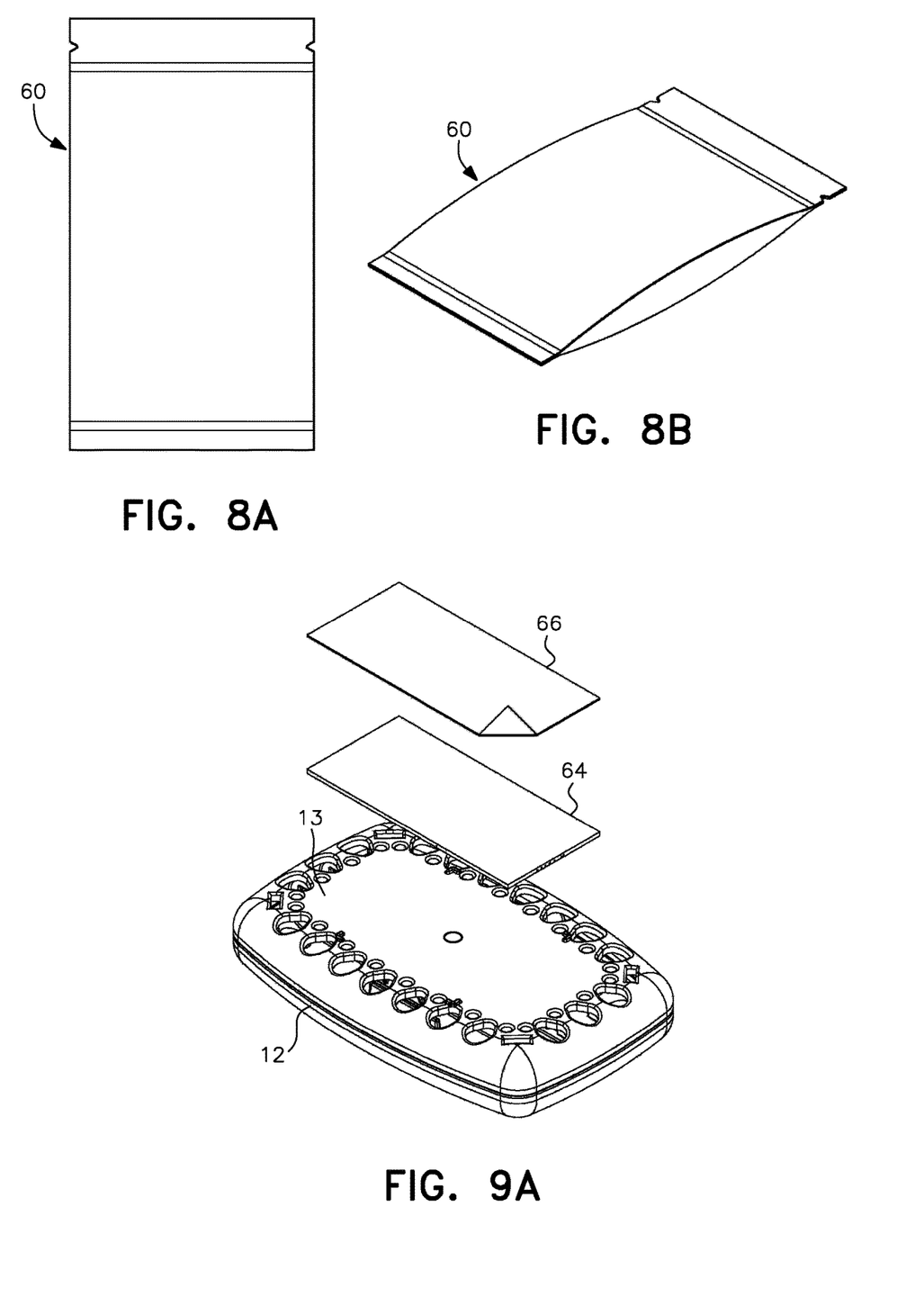
FIG. 8A is a planar view of a pouch for enclosing at least the gas-releasing poison substrate used within the device according to the present invention.
FIG. 8B is a perspective view of the pouch shown in FIG. 8A.
FIG. 9A is an exploded view of the outer housing, an adhesive coating to be applied directly to the outer surface of the housing and a release liner to cover the adhesive coating of an insect control device according to an alternate adhesive element configuration of the present invention.

When marketed, the housing and substrate strip 17 are preferably preassembled, with the substrate strip already contained within the inner space of the housing which is enclosed within a sealed bag, pouch or other containment layer or enclosure for distribution to the consumer. Planar and perspective views of a representative pouch, generally designated by reference numeral 60, are shown in FIGS. 8A and 8B. Just prior to use, the user removes the housing, with the strip inside, from the containment layer and applies the adhesive element 18, which may be embodied as a piece of double-sided adhesive tape provided as a separate component included with the housing, to one of the planar outer surfaces 13 of the housing. The device is then positioned within a garbage can, trash dumpster or trash bin and adhered to an inner surface of the receptacle by the other side of the adhesive element. Once secured inside, the device is out of the reach of children and pets while the low profile of the device does not interfere with either the placement of garbage into the receptacle or the emptying thereof.

Figure 1:
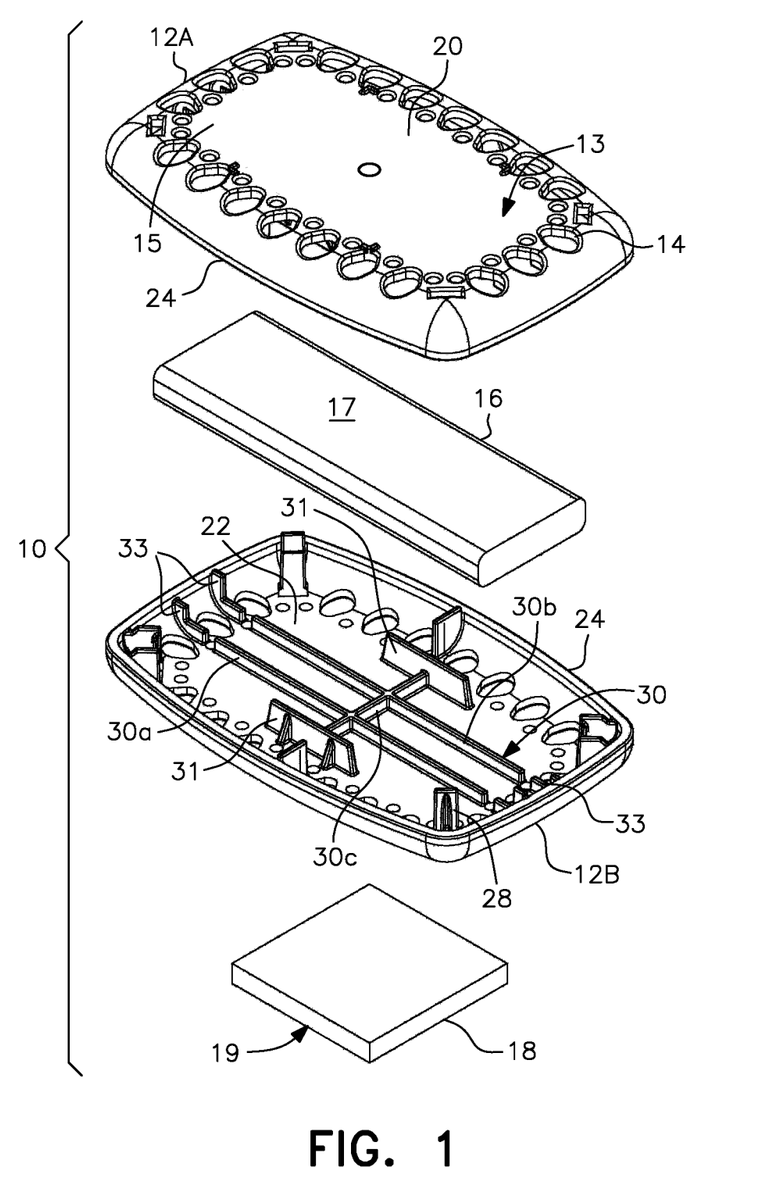
FIG. 1 is an exploded top perspective view of the components of an insect control device in accordance with the present invention.
Figure 2:
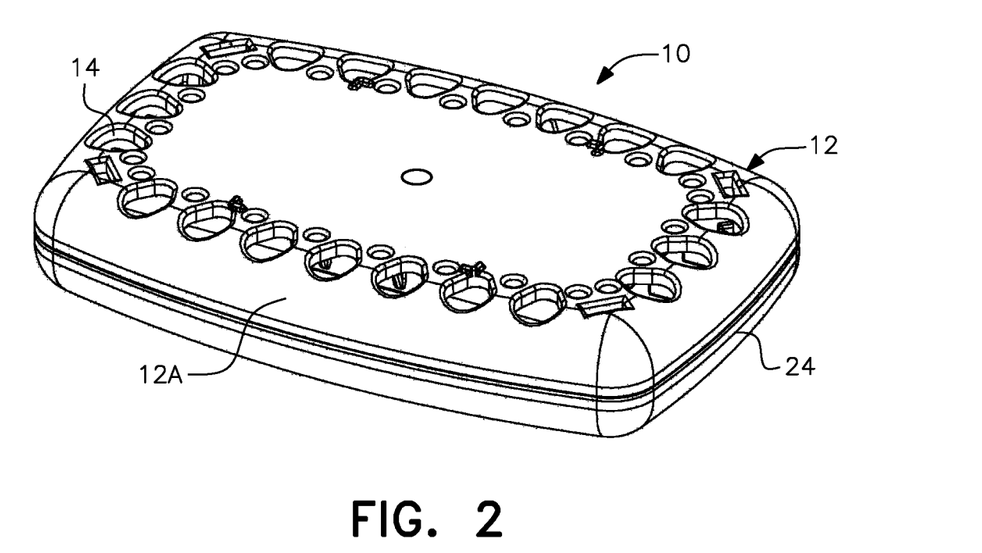
FIG. 2 is an assembled top perspective view of the insect control device shown in FIG. 1.
Figure 3:
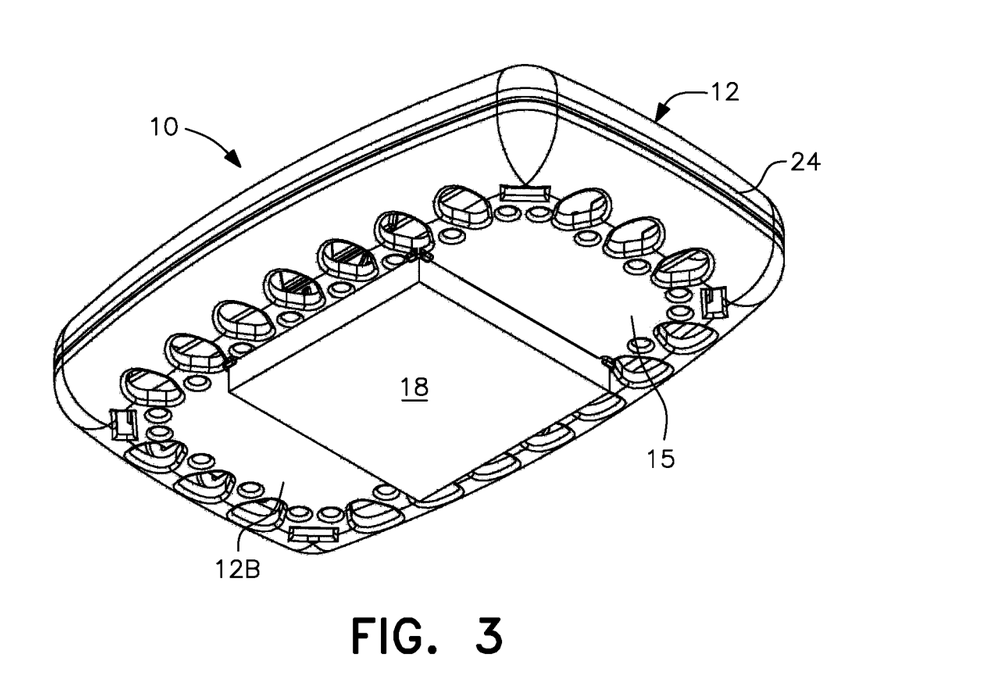
FIG. 3 is a bottom perspective view of the assembled insect control device shown in FIG. 2.
Figure 4:
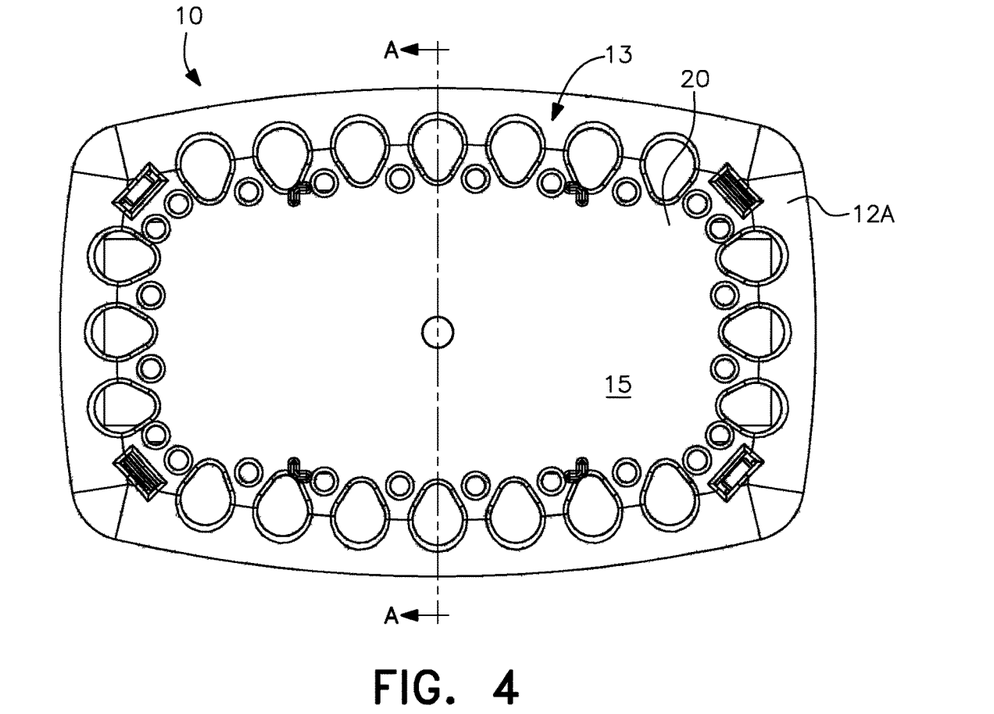
FIG. 4 is a top planar view of the insect control device as shown in FIG. 2.
Figure 5:
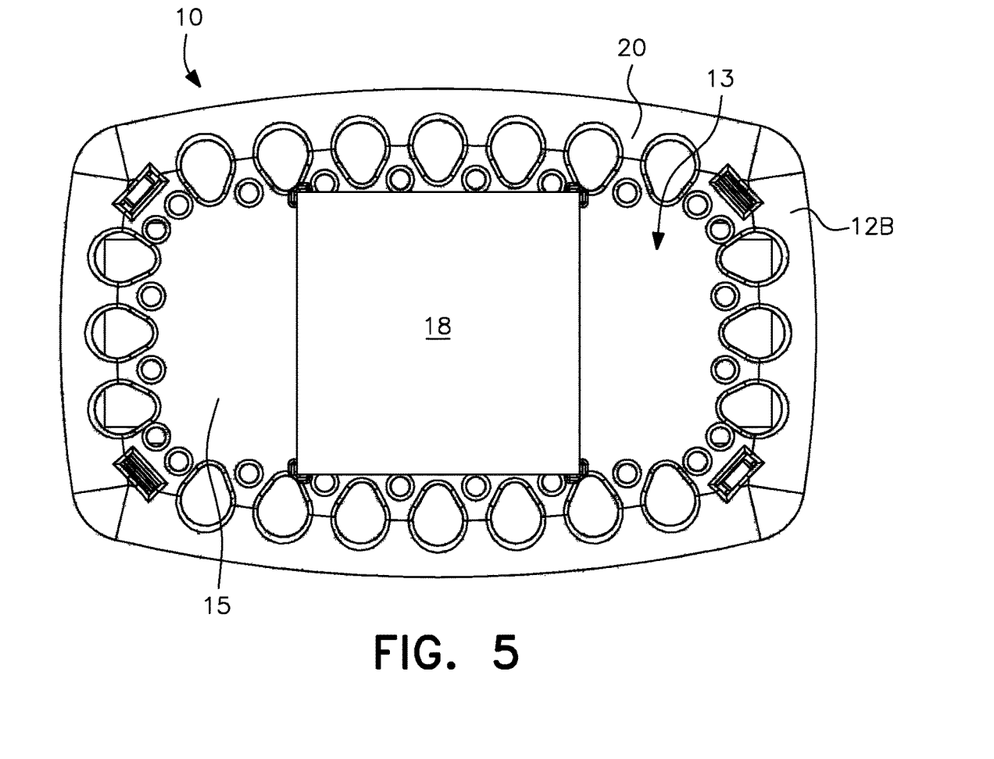
FIG. 5 is a bottom planar view of the insect control device as shown in FIG. 3.
Figure 6:
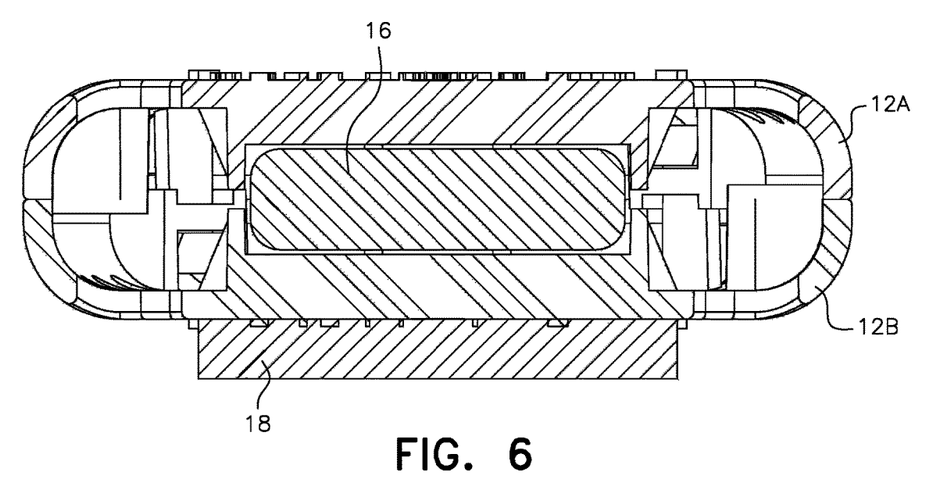
FIG. 6 is a cross sectional view taken along line A-A of FIG. 4.
Figure 7A:
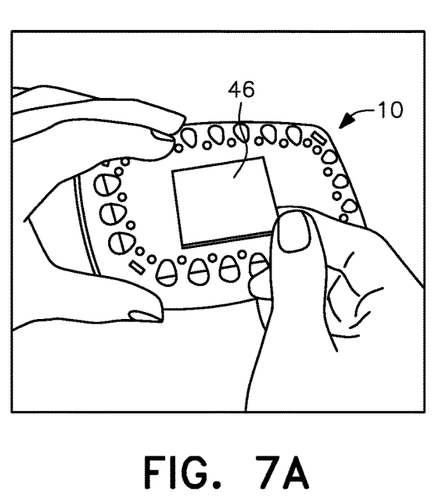
FIGS. 7A-7D show the steps taken by the user to uncover the adhesive and apply the insect control device to an inner surface of a lidded household garbage receptacle.
Figure 7B:
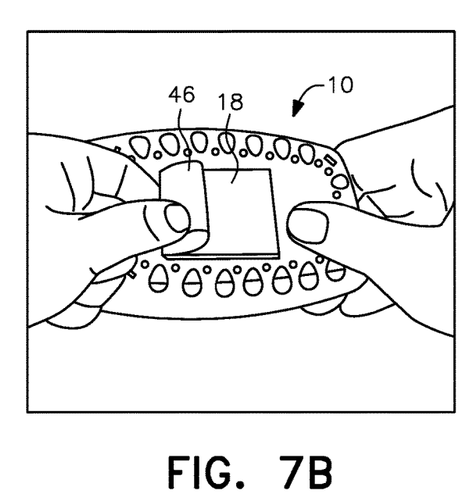
Figure 7C:
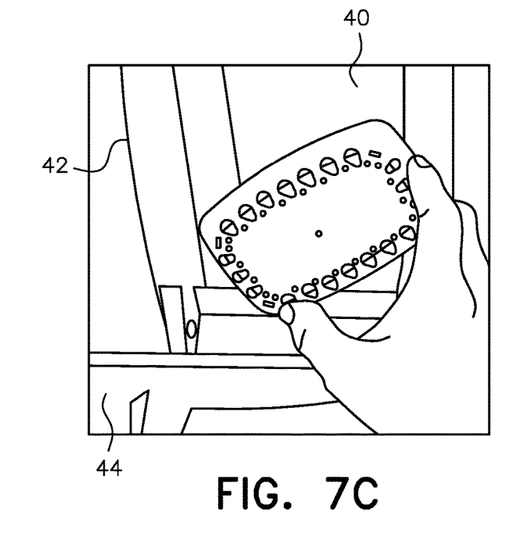
Figure 7D:
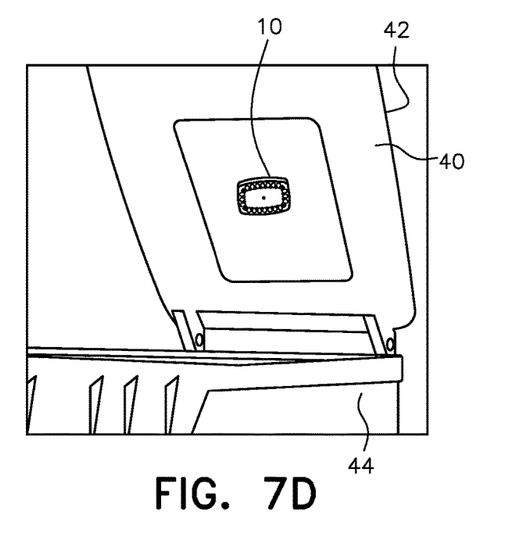
Figures 7E, 7F:
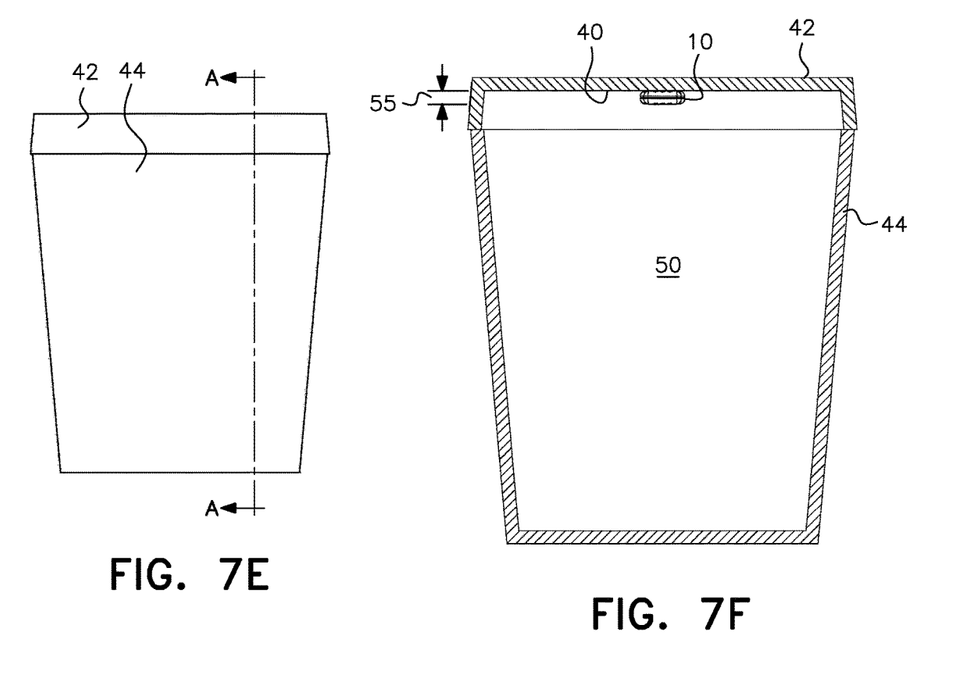
FIG. 7E is a side view of the household garbage receptacle shown in FIGS. 7C and 7D in which the insect control device has been secured and with the lid closed for use.
FIG. 7F is a cross-sectional view taken along line A-A of FIG. 7E.

FIGS. 7A-7D show the steps taken by the user to apply the insect control device to an inner surface of a lidded household garbage receptacle which is then closed for use as shown in FIG. 7E and in the section view of FIG. 7F. While the insect control device 10 may be placed on any inner surface of the receptacle, in the embodiment shown the device 10 is secured to the inside surface 40 of the lid 42 of the garbage receptacle 44 using the adhesive 18.

As shown in FIG. 7A, the adhesive 18 is preferably a piece of double-sided adhesive tape covered with a release layer 46 on each side which, as shown in FIG. 7B, are removed prior to 1) adhering the tape to the device and then 2) applying the device to the lid using the other side of the adhesive tape. When both layers 46 have been removed, FIG. 7C, and the insect control device adhesively secured to the inside surface 40 of the lid 42 of the garbage receptacle 44, FIG. 7D, the lid 42 is thereafter closed, FIGS. 7E and 7F, to define an enclosed garbage containment area 50. The gas released from the insect poison 16 passes through the apertures 14 and permeates the air within the enclosed garbage containment area 50, killing the insects therein and preventing further infestations. Further, the adhesive element 18 keeps the device held securely in place within the garbage receptacle during both use and emptying thereof, while a thickness profile 55 of the device (see FIG. 7F) is about 0.5 inches or less. As used in connection with the thickness profile, "about" in intended to refer to the stated value plus or minus 0.25 inches.

Figure 9B:
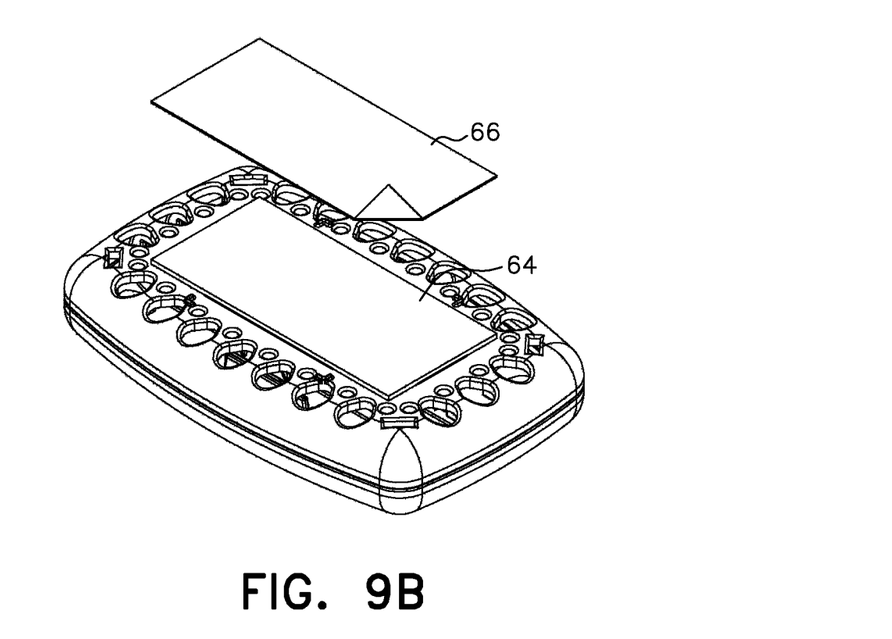
FIG. 9B is a partially assembled view of the components shown in FIG. 9A, the adhesive coating having been applied to the housing.
Figure 9C:
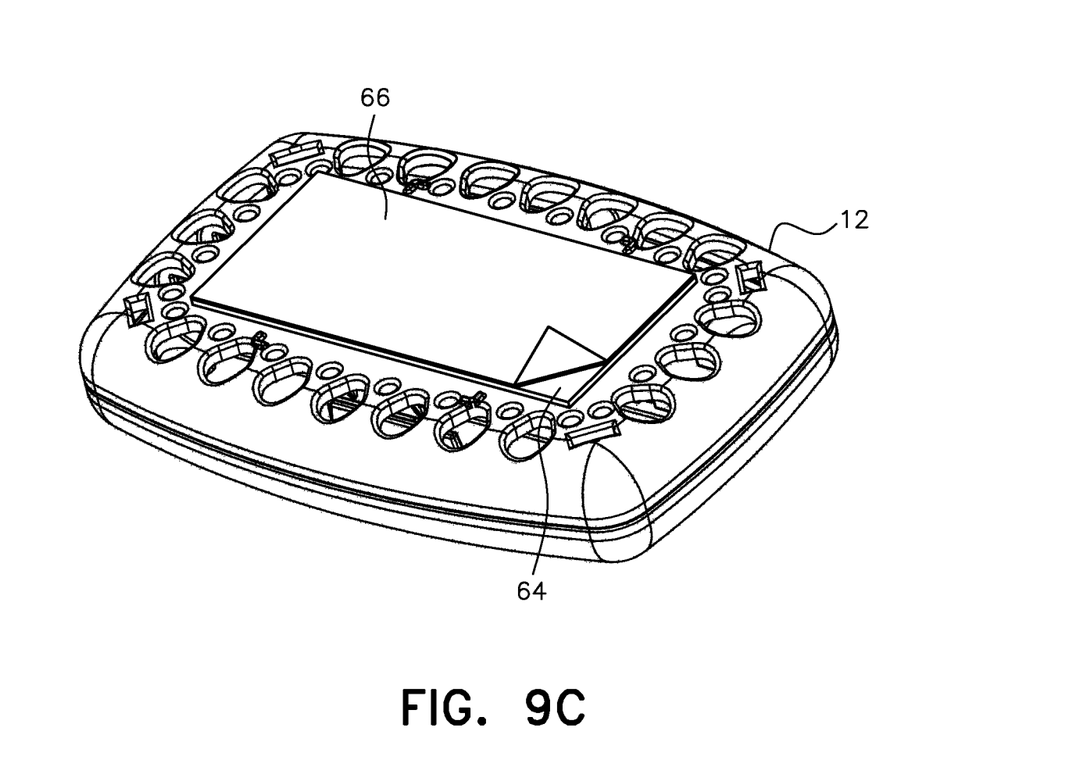
FIG. 9C is a fully assembled view of the components shown in FIG. 9A.
Figure 10A:
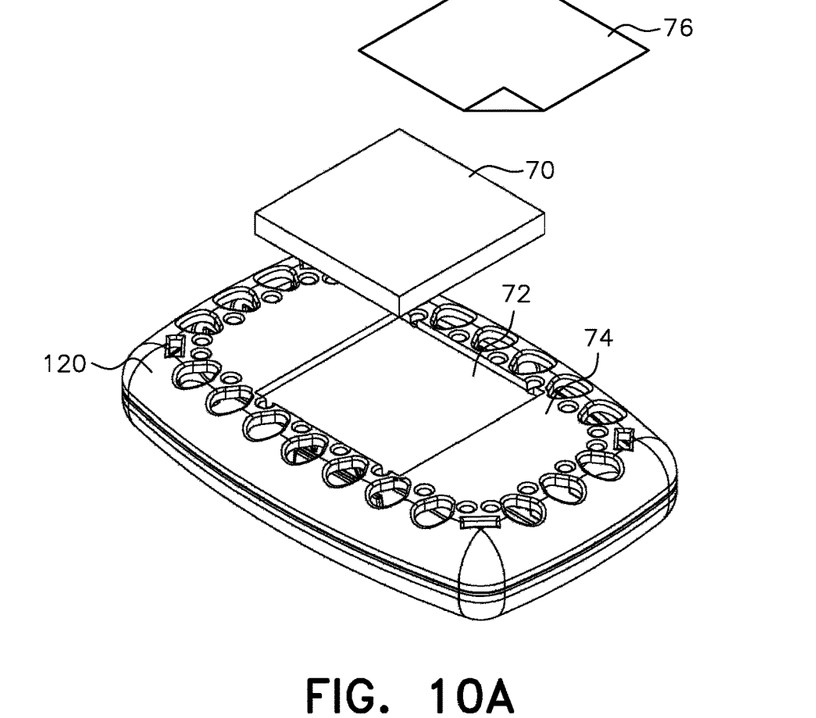
FIG. 10A is an exploded view of the components of another adhesive element configuration for an insect control device according to the present invention, the device including an outer housing having a recessed pocket to receive an adhesive element which is covered by a release liner.
Figure 10B:
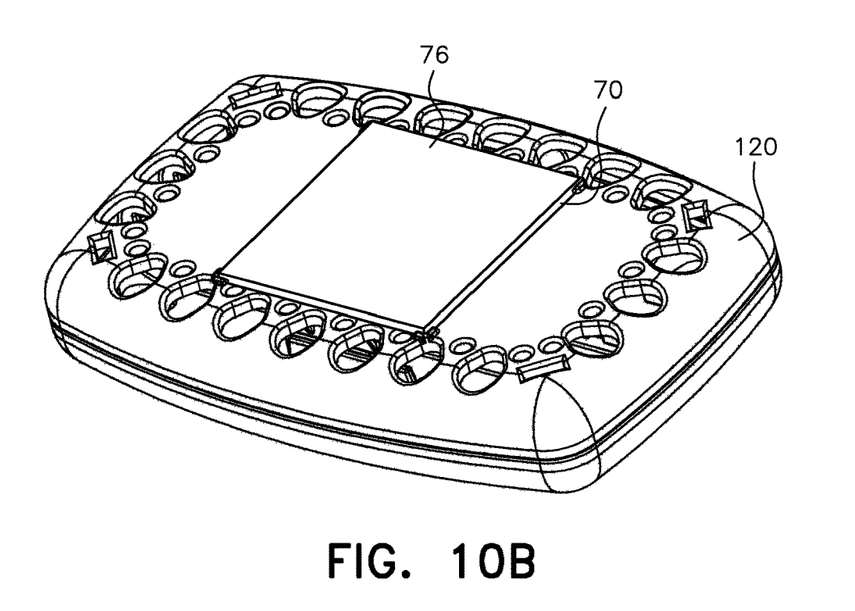
FIG. 10B is an assembled view of the components shown in FIG. 10A in which the adhesive element, when applied, protrudes to a limited degree from the recess.

Adhesive configurations other than double-sided adhesive tape may also be used in accordance with the present invention. These configurations include, but are not limited to, an adhesive coating 64 applied directly to the flat exterior surface 13 of the outer housing 12 and covered with a release liner 66 as shown in FIGS. 9A-9C, or art adhesive member 70 embedded in a recess 72 in an exterior surface 74 of the outer housing 120 as shown in FIG. 10A. When secured to the outer housing, the adhesive member 70 may be flush with the outer surface thereof in like manner as shown in FIG. 9C or may protrude slightly above the flat outer surface as shown in FIG. 10B. The outer surface of the adhesive member 70 is covered with a release liner 76. In each of these adhesive configurations, the consumer need only remove the release liner to expose the adhesive area on the exterior surface of the outer housing and apply the device to the inner surface of the trash receptacle for use.

While not the preferred embodiment, the insect control device according to the present invention may be packaged for distribution to the consumer with just the substrate strip contained within the pouch. Prior to use the user would then remove the strip from the pouch, place the strip within the housing and secure the housing pieces to one another to form a closed configuration containing the unwrapped strip. If not already attached to or coated on the housing, the adhesive element is then secured to the housing and the device positioned within a garbage can, trash dumpster or trash bin and adhered to an inner surface of the receptacle.

As described herein, the insect control device according to the present invention works effectively to kill insects within a closed or lidded household garbage receptacle, such as a garbage can, trash dumpster, trash bin, and the like, that is kept in an outdoor or semi-outdoor environment by permeating the air within the receptacle. The poison is typically held within a substrate enclosed within the housing that is infused with, or otherwise contains, the insect poison. Prior to use, the substrate (or the substrate as pre-assembled within the housing) is kept within a sealed outer pouch made of plastic, foil, or the like. Once the sealed outer pouch is removed and with the strip being secured within the housing, the apertures in the housing allow the gaseous fumes released from the substrate to pass into the enclosed garbage containment area in which the device has been placed. Because the device is adhesively secured inside the receptacle there is no risk of direct exposure to animals, children or plants that may be near the garbage container. Upon opening of the lid, any gases escaping from the receptacle will dissipate into the open air of the outdoor or semi-outdoor environment without harming people, animals or plants in the surrounding area. As a result, the insect control device is easy to use while being safe and effective for controlling insects when used as directed.

In use and according to the preferred embodiment, the device housing and substrate are marketed in a pre-assembled configuration with a containment layer wrapped around the assembly such that the housing does not need to be opened by the consumer. In this configuration, the adhesive element may be part of the assembly, such as coated onto the planar surface or already secured to one side of the outer housing as shown in FIGS. 9C and 10B with a single release liner on the outer side, for attaching the device to the garbage receptacle. Alternatively, the adhesive element may be separate and mounted to the housing by the consumer after removal of the assembly from the outer containment layer.

The present invention is also directed to a method of controlling insects in an outdoor garbage receptacle having a lid or other closed container. The method includes adhering the insect control device to an inner surface of the garbage receptacle, which may be a garbage can, trash dumpster, trash bin and the like, with the insect control device including an outer housing having at least one gas-flow aperture therein and a quantity of gas releasing insect poison positioned within the housing. Once secured, the method includes closing the lid, or otherwise closing the trash container, for use. While in use, a gaseous component of the poison escapes from the outer, housing through the at least one gas-flow aperture therein to permeate an enclosed garbage containment area defined by the outdoor garbage receptacle or other container. The low profile of the device does not interfere with the garbage containing volume of the garbage receptacle, and securing of the device to the inner surface of the receptacle by adhesive prevents inadvertent contact by animals, children or plants that may be in the area around the receptacle.

According to a preferred embodiment, the gaseous component of the insect poison in the insect control device is released over time to effectively kill flying and crawling insects including flies, gnats, mosquitos, moths, silverfish, cockroaches, spiders, beetles, earwigs, spider mites, and the like. According to the preferred embodiment, the insect control device includes a quantity of poison-infused substrate, such as 18.6% Dichlorvos, that weighs about 5.25 grams, which will treat 50 cu. ft. of enclosed space for about four months when the insect control device is placed within a closed household garbage can, trash dumpster or trash bin. For larger enclosed areas, multiple insect control devices may be placed within the trash or garbage container.

The foregoing descriptions and drawings should be considered as illustrative only of the principles of the invention. The invention may be configured in a variety of shapes and sizes and is not limited by the dimensions of the preferred embodiment. Therefore, it is not desired to limit the invention to the specific examples disclosed or the exact construction and operation shown and described. Rather, all suitable modifications and equivalents may be resorted to, falling within the scope of the invention.

What is claimed is:

1. An insect control device for use inside a household outdoor garbage receptacle or other container comprising:
    an outer housing having at least one gas-flow aperture therein;
    a substrate infused with gas-releasing insect poison positioned within the housing, a gaseous component of the poison escaping from the outer housing through the at least one gas-flow aperture therein; and
    an adhesive attaching element having a first portion embedded within a recess in an exterior of the outer housing and an exposed second portion extending above an exterior surface of the exterior of the housing for securing the device inside an outdoor household garbage receptacle or other container, the gaseous component of the poison being contained within an enclosed garbage containment area defined by the outdoor garbage receptacle when in use.

2. The insect control device as set forth in claim 1, wherein the adhesive attaching element is a piece of double-sided adhesive tape adhered on a first side to the device and on a second side to the inside of the outdoor household garbage receptacle.

3. The insect control device as set forth in claim 1, wherein the housing includes a plurality of gas-flow apertures and a non-apertured region, the adhesive attaching element being secured to the non-apertured region.

4. The insect control device as set forth in claim 1, wherein the adhesive attaching element is coated onto an exterior surface of the outer housing and covered with a release liner.

5. The insect control device as set forth in claim 1, wherein the housing is between about 2 inches to about 4 inches in length, about 1.75 inches in width, and is about 0.5 inches thick, and the substrate is a 5.25 gram strip containing 18.6% Dichlorvos.

6. The insect control device as set forth in claim 1, wherein the housing includes two interchangeable pieces that fasten together with a snap fit, the substrate being positioned in an inner space defined by the two halves.

7. The insect control device as set forth in claim 6, wherein each interchangeable piece includes spacing and support members, the substrate being sandwiched between said spacing and support members when the housing is assembled.

8. The insect control device as set forth in claim 7, wherein the spacing and support members include two longitudinal ribs intersected by a transverse rib.

9. The control device as set forth in claim 8, further comprising two alignment members, one at each end of the transverse rib, the alignment members being generally parallel with the longitudinal ribs and acting as stops to keep the substrate laterally centered within the housing.

10. A method of controlling insects in an outdoor household garbage receptacle or trash container having a closure comprising:

securing insect control device to an inner surface of the garbage receptacle using an adhesive member, the insect control device including an outer housing having at least one gas-flow aperture therein and a quantity of gas-releasing insect poison arranged within a gas containment enclosure, the gas-releasing poison and the gas containment enclosure positioned within the housing;

removing the gas-releasing insect poison from within the gas containment enclosure; and closing the closure, a gaseous component of the poison escaping from the outer housing through the at least one gas-flow aperture therein to permeate an enclosed garbage containment area defined by the outdoor garbage receptacle when in use, the adhesive member keeping the device securely in place against the inner surface of the garbage receptacle during use and emptying of said receptacle.

11. An insect control device for use inside a household outdoor garbage receptacle or other container comprising:

an outer housing having at least one gas-flow aperture therein;

a substrate infused with gas-releasing insect poison positioned within the housing, the substrate being pre-assembled within the outer housing and surrounded by a gas containment layer, the substrate surrounded by the gas containment layer within the housing during storage and prior to use, a gaseous component of the poison escaping from the outer housing through the at least one gas-flow aperture therein after the gas containment layer is removed for use of the device within the household outdoor garbage receptacle.

12. An insect control device for use inside a household outdoor garbage receptacle or other container comprising:

an outer housing having two pieces that fasten to one another to define an interior space, each piece having a plurality of gas-flow apertures therein and including longitudinal spacing and support members each defining flat support surfaces that project into the interior space and extend continuously from a first end proximate a first longitudinal end of the housing piece to a second end proximate a second longitudinal end of the housing piece;

a substrate infused with gas-releasing insect poison positioned within the housing interior space, the substrate defining opposite planar exterior surfaces oriented parallel to and abutting the flat support surfaces along their length with the substrate sandwiched between the spacing and support members, a gaseous component of the poison escaping from the outer housing through the plurality of gas-flow apertures therein when the device is in use.

13. The insect control device as set forth in claim 12, wherein the spacing and support members project from an interior surface of each housing piece and into the interior space for supporting the substrate continuously along the length of each flat support surface at a distance from each the interior surface of each housing piece.

14. The insect control device as set forth in claim 13, further comprising two alignment members distinct from the spacing and support members, the alignment members arranged on either side of the substrate and acting as stops to keep the substrate laterally centered within the housing, each alignment member defining a planar face oriented perpendicularly relative to the flat support surfaces of the support members.

15. The insect control device as set forth in claim 14, further comprising a longitudinal stop distinct from the spacing and support members, the longitudinal stop oriented proximate each end of the housing and defining a support surface oriented perpendicularly relative to the flat support surfaces of the spacing and support members for centering the substrate longitudinally within the housing.

16. The insect control device as set forth in claim 15, wherein the two longitudinal ribs are intersected by a transverse rib intermediately along their lengths, the transverse rib defining a flat support surface abutting the planar exterior surface of the substrate.

17. The insect control device as set forth in claim 15, wherein each longitudinal stop is arranged adjacent and separated from a respective one of the first and second ends of the longitudinal ribs.

18. The insect control device as set forth in claim 16, wherein each of the two alignment members are arranged at one end of the transverse rib.

19. The insect control device of claim 11, wherein the gas containment layer comprises a sealed enclosure within which the substrate is arranged.

20. The insect control device as set forth in claim 17, wherein each longitudinal stop further defines a flat support surface oriented parallel with the flat support surfaces of the spacing and support members.

* * * * *